United States Patent Office 2,726,250
Patented Dec. 6, 1955

2,726,250

5-MONOSUBSTITUTED 2-OXO-2,5-DIHYDRO-FURANS

Niels Konrad Friedrich Wilhelm Clauson-Kaas, Klampenborg, Denmark, assignor to Kemisk Vaerk Koge A/S, Copenhagen, Denmark, a firm No Drawing. Application May 15, 1951,
Serial No. 226,541

5 Claims. (Cl. 260—343.6)

The present invention relates to 5-mono-substituted-2-oxy-2,5-dihydrofurans and methods for their production.

It is an object of the invention to provide for new and useful 5-monosubstituted 2-oxo-2,5-dihydrofurans which may serve as intermediates in organic synthesis and for the production of β-formylacrylic acid.

Another object is to provide for a method of producing said compounds.

With these and other objects in view which will appear from the following, I will now proceed with a detailed description, which, however, is not to be considered as limiting the invention since obvious modifications will appear to a person skilled in the art.

The new compounds are prepared from 2-acetoxyfuran, the preparation of which is described in my copending application, Serial No. 226,542, filed May 15, 1951.

According to the invention 2-acetoxyfuran (I) is reacted with an oxidizing agent, whereby 5-monosubstituted 2-oxo-2,5-dihydrofurans (II) are formed, which are derivatives of, and may easily be hydrolyzed to β-formylacrylic acid (III):

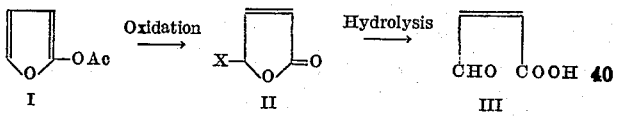

where Ac is acetyl, and X represents a monovalent radical which has been introduced by the oxidizing agent.

The reagents intended to be used according to the invention are such cationoid oxidizing reagents as halogens, particularly bromine and chlorine.

With bromine the oxidation proceeds according to the following scheme of reaction:

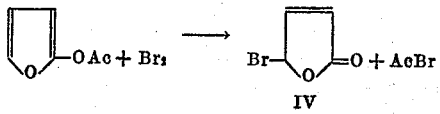

The 2-oxo-5-bromo-2,5-dihydrofuran (IV), which is a new compound, yields β-formylacrylic acid by hydrolysis:

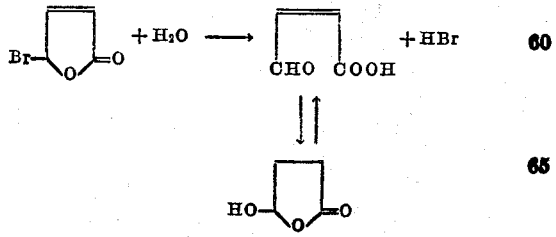

The invention is further illustrated by the following example:

Example 5 ccs. of bromine dissolved in 20 ccs. of carbon tetrachloride are added dropwise to a solution of 12.5 g. of 2-acetoxyfuran in 20 ccs. of carbon tetrachloride during 8 minutes at a temperature between —5 and —10° C., while stirring. The nearly colorless reaction mixture is distilled at 30–40° C. under 15 mm. from a water bath until nothing more distills off. Then the residue is distilled under 10 mm. whereby 14.7 g. of 2-oxo-5-bromo-2,5-dihydrofuran, corresponding to 90% of the theoretical, distills off at 101–102° C. The refractive index $n_D^{25}$ is 1.5343. The compound speedily becomes dark-colored, but after repeated distillations, first under 10 mm. and then under 1 mm., a product is obtained which is colorless. The yield is 12.9 g. The boiling point under 1 mm. is 69–70° C., and $n_D^{25}$ of the purified product is 1.5348.

$C_4H_3O_2Br$ (163.0) Calc.: C, 29.5; H, 1.9; Br, 49.0.
Found: C, 29.6; H, 2.1; Br, 49.7.

I claim:

1. Method of producing 5-monosubstituted 2-oxo-2,5-dihydrofurans comprising the step of reacting 2-acetoxyfuran at a temperature of below room temperature with a halogen selected from the group consisting of chlorine and bromine.

2. Method of producing 2-oxo-5-bromo-2,5-dihydrofuran comprising the step of reacting 2-acetoxyfuran with bromine at a temperature below room temperature.

3. 2-oxo-5-bromo-2,5-dihydrofuran.

4. 2-oxo-5-halo-2,5-dihydrofurans, in which the halogen radical is a member of the group consisting of chlorine and bromine.

5. The method of producing 5-monosubstituted 2-oxo-2,5-dihydrofuran, which comprises gradually adding a solution of bromine to a solution of 2-acetoxyfuran at a temperature of between —5° and —10° C. under atmospheric pressure and recovering the resulting dihydrofuran by fractionally distilling the reaction mixture.

References Cited in the file of this patent

Whiting: JACS, vol. 71, pp. 2946–7 (1949).
Beilstein: Handbuch der Organisch. Chem., vol. XVII, p. 251 (1933).
Beilstein: Handbuch der Organisch. Chem., vol. XVIII, 1st Supp., p. 138 (1934).
Beilstein: Handbuch der Org. Chem., vol. 3, p. 728 (1921).
Beilstein: Handbuch der Org. Chem., vol. 17, pp. 250–51 (1933).